(12) United States Patent
Schnaitter (10) Patent No.: US 8,496,379 B2
(45) Date of Patent: Jul. 30, 2013

(54) SYSTEMS AND METHODS FOR DETERMINING DEVICE TEMPERATURE

(76) Inventor: William N. Schnaitter, San Ramon, CA (US)

( * ) Notice: Subject to any disclaimer, the term of this patent is extended or adjusted under 35 U.S.C. 154(b) by 0 days.

(21) Appl. No.: 12/868,548

(22) Filed: Aug. 25, 2010

(65) Prior Publication Data

US 2012/0183017 A1   Jul. 19, 2012

Related U.S. Application Data

(62) Division of application No. 11/639,603, filed on Dec. 15, 2006, now Pat. No. 7,798,707.

(51) Int. Cl.
*G01K 7/00* (2006.01)

(52) U.S. Cl.
USPC ............................ 374/178; 374/170; 327/512

(58) Field of Classification Search
USPC .................................. 374/178, 170; 327/512
See application file for complete search history.

(56) References Cited

U.S. PATENT DOCUMENTS

| | | |
|---|---|---|
| 2002/0196692 A1 | 12/2002 | Fiscus |
| 2005/0271115 A1 | 12/2005 | Takeuchi |
| 2006/0044047 A1 | 3/2006 | Porter |
| 2006/0153277 A1 | 7/2006 | Yoshida |
| 2009/0201067 A1 | 8/2009 | Haneda |
| 2009/0256623 A1 | 10/2009 | Tajima |

OTHER PUBLICATIONS

Restriction Requirement Dated Oct. 19, 2009; U.S. Appl. No. 11/639,603.
Non-Final Office Action Dated Jan. 27, 2010; U.S. Appl. No. 11/639,603.
Notice of Allowance Dated May 20, 2010; U.S. Appl. No. 11/639,603.

*Primary Examiner* — Mirellys Jagan (57) ABSTRACT

Circuitry for measuring and/or monitoring device temperature may include a first node coupled to ground, and a second node and a first resistor coupled in series to ground and in parallel to the first node. A first current driven to the first node and a second current driven to the second node can be selected such that a first voltage measured at the first node and a second voltage measured at the second node are substantially equal. The circuitry may also include a third node and a second resistor coupled in series to ground. A third current driven to the third node can be selected such that a third voltage measured at the third node is substantially equal to a reference voltage. Measures of the second and third currents and measures of the first and second resistors can be used to determine device temperature.

15 Claims, 3 Drawing Sheets

```
ADJUST A FIRST CURRENT DRIVING A FIRST NODE AND A SECOND CURRENT DRIVING
A SECOND NODE COUPLED TO A FIRST RESISTOR UNTIL A FIRST VOLTAGE AT THE
FIRST NODE AND A SECOND VOLTAGE AT THE SECOND NODE ARE EQUAL
302
```

```
ADJUST A THIRD CURRENT DRIVING A THIRD NODE COUPLED TO A SECOND RESISTOR
UNTIL A THIRD VOLTAGE AT THE THIRD NODE EQUALS A REFERENCE FOURTH
VOLTAGE
304
```

```
USE MEASURES OF THE SECOND AND THIRD CURRENTS AND MEASURES OF THE
FIRST AND SECOND RESISTORS TO DETERMINE A TEMPERATURE
306
```

```
DRIVE A FIRST CURRENT TO A FIRST NODE AND A SECOND CURRENT TO A SECOND
NODE COUPLED TO A FIRST RESISTOR
402
```

```
DRIVE A THIRD CURRENT TO A THIRD NODE COUPLED TO A SECOND RESISTOR
404
```

```
PROVIDE AN INDICATION THAT A SPECIFIED TEMPERATURE THRESHOLD HAS BEEN
CROSSED
406
```

FIGURE 4

SYSTEMS AND METHODS FOR DETERMINING DEVICE TEMPERATURE

RELATED UNITED STATES PATENT APPLICATION

This application is a Continuation (Divisional) Application of the co-pending, commonly-owned U.S. patent application Ser. No. 11/639,603, filed Dec. 15, 2006, by W. N. Schnaitter, and entitled "Systems and Methods for Determining Device Temperature."

BACKGROUND OF THE INVENTION

1. Field of the Invention

Embodiments of the present invention relate to the operation of semiconductor devices.

2. Related Art

A thermometer onboard a device such as an integrated circuit (e.g., a processor or microprocessor) can be used to measure the operating temperature of the integrated circuit. Operation of the device can then be managed according to how the operating temperature compares to the design limit temperature. If, for example, the operating temperature of a microprocessor is less than its design limit, the frequency at which the microprocessor is operating can be increased, allowing the microprocessor to perform tasks more rapidly. Conversely, if a microprocessor is operating at a temperature exceeding the design limit, its frequency can be reduced to extend the life of the microprocessor.

Accurate measurements of temperature can be important to help ensure that an integrated circuit does not exceed its design limit, especially if operation at or near the design limit is anticipated for any length of time.

SUMMARY OF THE INVENTION

Embodiments in accordance with the present invention provide methods and systems for accurately measuring temperature in, for example, a device such as an integrated circuit.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or the like, refer to the action and processes (e.g., flowcharts 300 and 400 of FIGS. 3 and 4, respectively) of a computer system or similar intelligent electronic computing device (generally, a controller), that manipulates and transforms data represented as physical (electronic) quantities within the computer system's registers and memories into other data similarly represented as physical quantities within the computer system memories or registers or other such information storage, transmission or display devices.

Figure 1:
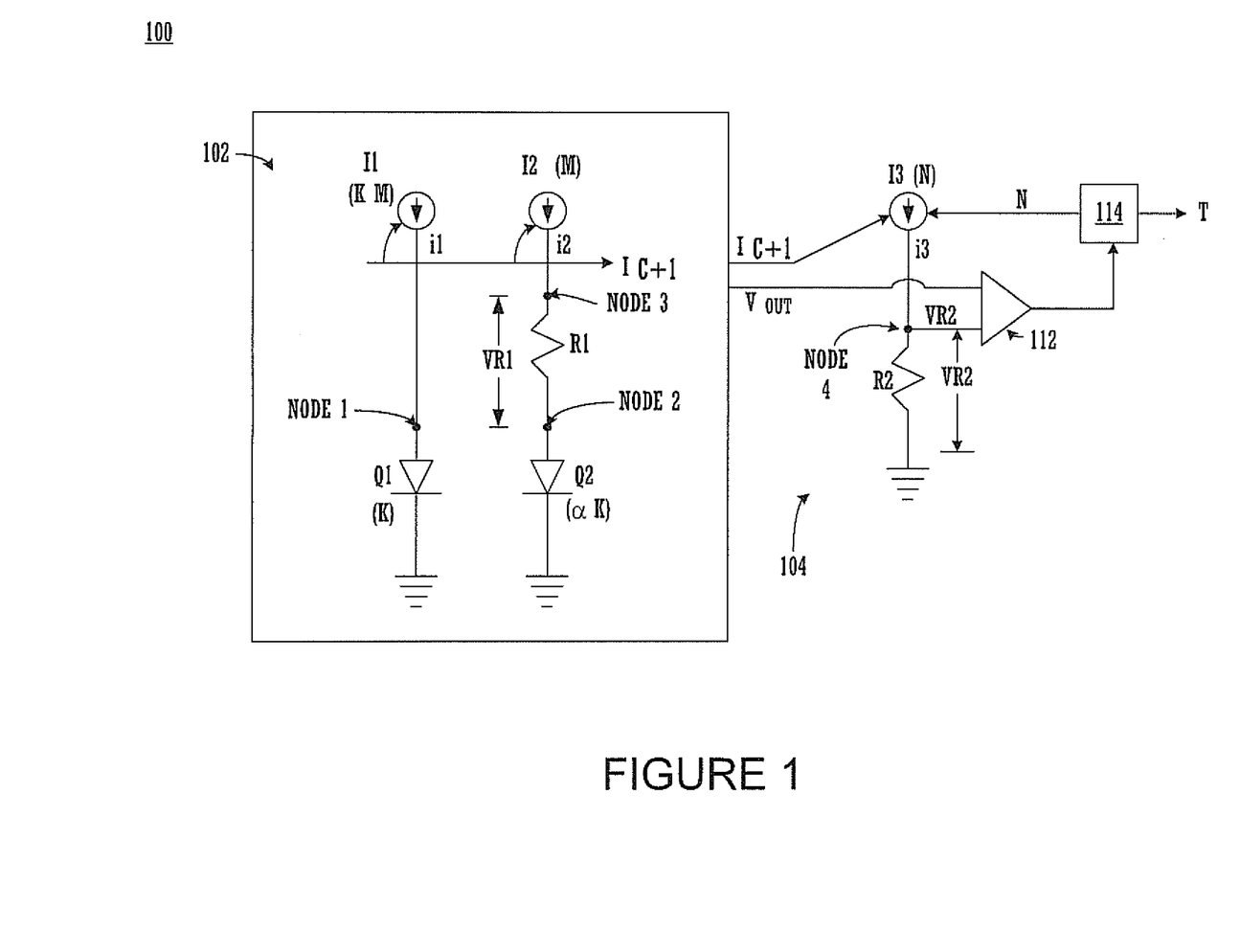
FIG. 1 is a diagram of a system for measuring temperature according to one embodiment of the present invention.
Figure 2:
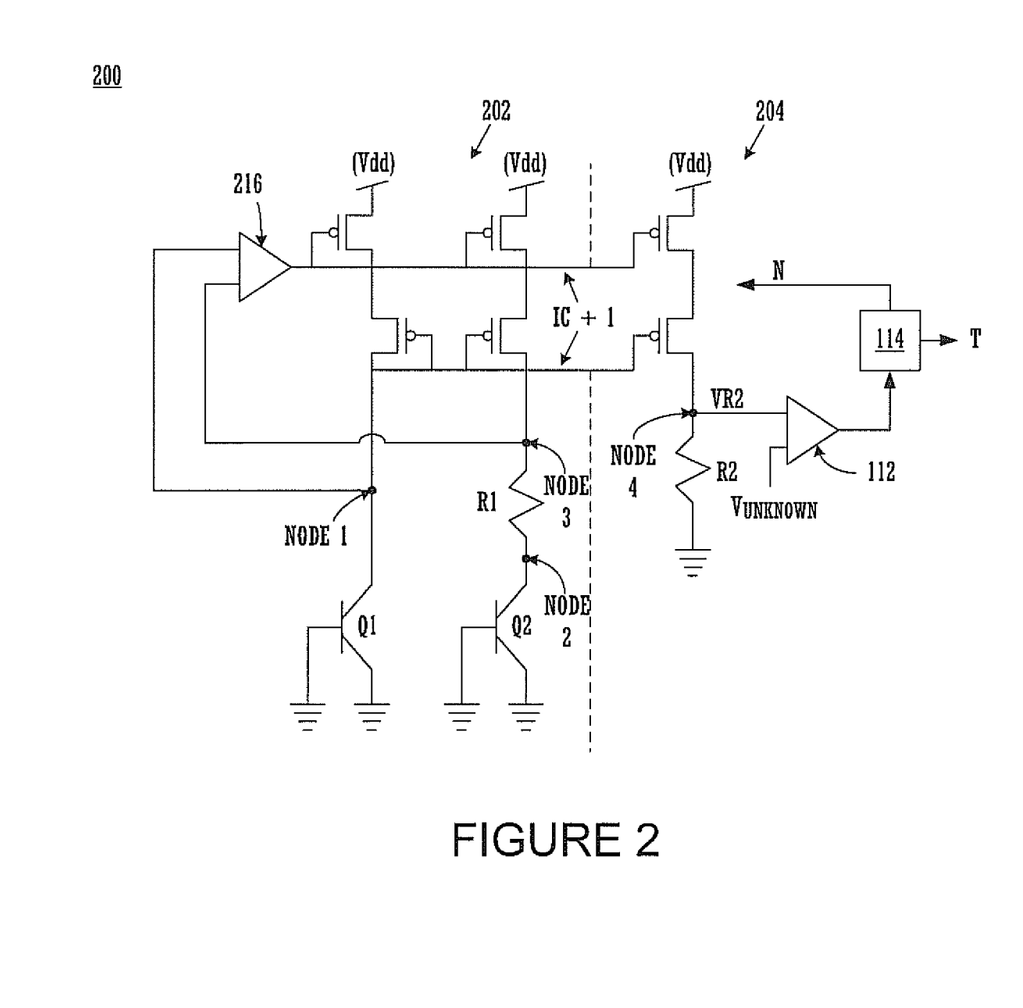
FIG. 2 is a diagram of a system for measuring temperature according to a second embodiment of the present invention.

FIG. 1 is a diagram of a system 100 for measuring and/or monitoring temperature according to one embodiment of the present invention. FIG. 2 is a diagram of a system 200 for measuring temperature according to a second embodiment of the present invention. In general, the elements of FIGS. 1 and 2 are described according to the functions they perform. However, elements may perform functions in addition to those described herein. Also, functions described as being performed by multiple elements may instead be performed by a single element. Similarly, multiple functions described as being performed by a single (e.g., multifunctional) element may instead be divided in some way amongst a number of individual elements. Furthermore, the systems of FIGS. 1 and 2 and each of their elements may include elements other than those shown or described herein.

In the example of FIG. 1, system 100 includes first circuitry 102 and second circuitry 104. In one embodiment, first circuitry 102 includes a variable first current source I1, a variable second current source I2, a first p-n junction Q1 (e.g., a diode), a second p-n junction Q2 (e.g., a diode), and a first resistor R1, while second circuitry 104 includes a variable third current source I3 and a second resistor R2. In one embodiment, system 100 also includes a comparator 112 and a controller 114.

An important point is that, in one embodiment, a large number of current-source elements, laid out physically together in an array, are used to construct the three current sources I1, I2 and I3. In such an embodiment, all of the current-source elements are "identical" (that is, virtually identical), consistently driving identical small currents. In one such embodiment, each element is adjustable in an analog fashion by one or more analog control input pins or other means that can receive an analog control to adjust the current. For example, each current-source element can be a single PMOS transistor (operated in the saturation region, as is well known). The analog control pin for each such element can be the gate pin of the PMOS transistor. In a more complex design, each current-source element can be comprised of a current-source PMOS, a cascode PMOS and one or two transistors for disabling the element. This latter type of element would perform better than the former but uses two analog control input pins: one for the current-source PMOS gate and one for the cascode PMOS gate. In one embodiment, the voltage on the analog control pin(s) of all current-source elements is the same. This can be done by tying all of the analog control input pins together. (In the case of the more complex element just described, all the current-source PMOS gates are commoned and all the cascode PMOS gates are commoned.) In another embodiment, these analog control pins are accessed through analog gates controlled by logic circuitry that either apply the analog control voltage to each current-source element, or apply a disabling (high) voltage to deselect certain current-source elements. In this fashion, all selected elements will drive out identical currents while all deselected elements will drive out zero current. In any case, each selected current-source element will drive out the same current as every other selected current-source element. The analog control voltage can be supplied by analog circuit action as shown in FIG. 2, where a servo loop or other device adjusts the current of all (activated) current-source elements in concert.

The servo loop or other device adjusts the current of all (activated) current-source elements in concert so that the current driven by the current-source elements varies with temperature and, in fact, is proportional to absolute temperature. A portion of a system that can perform such a function is that shown as 102 in FIG. 1 and is described in more detail below. In FIG. 2, the circuitry block 202 performs this function. To reiterate, an important point of the thermometer design described herein is that all of the current-source elements are controlled in concert to have (virtually) identical currents that are proportional to absolute temperature.

As mentioned, each of the three current sources I1, I2 and I3 may be composed of a number of these current-source elements. This is accomplished by wiring together all the output pins of all current-source elements that comprise the current source I1, wiring together all the output pins of all current-source elements that comprise the current source I2, and wiring together all the output pins of all current-source elements that comprise the current source I3. Even disabled current-source elements can have the output pin connected, but will contribute no current. The number of elements that make up I1 and I2 may be the same or different, depending on the design details, and may be programmable or not. The elements that make up I3 are programmable by a logic control device that can select (activate) the desired number of current-source elements. In this fashion, the current source I1 can be made up of a number of identical current-source elements, say κM (an integer), where κ is a rational number and M is an integer determined by details of the system design. For example, M can be 8 and κM can be 16, in which case κ is 2. As another example, M can be 17 and κM can be 23 current-source elements, in which case κ is 23/17. Thus, the current i1 driven by the current source I1 is the number κM multiplied by the current from a single current-source element. Similarly, the current source I2 can be made up of a number of identical current-source elements, say M. Thus, the ratio i1/i2 of the current driven by the current source I1 divided by the current driven by the current source I2 is κ. This ratio can be made quite precise, even accurate to three significant figures in a practical circuit. Suppose that the number of current-source elements in the current source I3 is N. Then the ratio i3/i2 of i3, the current driven by the current source I3 divided by i2, is N/M to high precision. Such precision is used to provide an accurate thermometer system as described herein. In this way, the current-source elements all drive the same current while the current sources I1, I2 and I3 each drive a respective different current by being comprised of different numbers of identical such current-source elements. Because at least one current source, I3, has a programmable number, the integer N should also be programmable.

Out of the large array of current-source elements, the choice of which current-source elements to wire together to make up each of the current sources I1, I2 and I3 is made in such a way as to improve the accuracy of the ratios between the three sources. This may be done through centroiding the current-source elements, as is well understood by those skilled in the art. The current-source elements chosen to be wired together to make up the current source I1 can be physically positioned within the array in a symmetrical pattern around a "centroid" point in the array, typically a point in the center of the array. Similarly, those current-source elements chosen to be wired together to make up the current source I2 can be physically positioned within the array in a symmetrical pattern around the same centroid point in the array. Those current-source elements chosen to be wired together to make up the current source I3 can also be centroided about the same point in a way that they remain centroided as the number N of activated current-source elements is programmed to different numbers.

In one embodiment, first circuitry 102 is a portion of a typical bandgap (e.g., silicon bandgap) reference circuit. In general, first circuitry 102 is a precision circuit that supplies a voltage Vout that is substantially insensitive to the circuitry's supply voltage and operating temperature. The voltage Vout may be a full or fractional bandgap voltage, depending on the type of circuit, and is accurately known. Only certain elements of a bandgap reference circuit are shown and described herein. More specifically, in the embodiment of FIG. 1, the elements of a bandgap reference circuit that are relevant to an understanding of the present embodiment are illustrated while other elements not relevant to that understanding are left out.

In the example of FIG. 1, p-n junction Q1 has an anode coupled to node 1 and a cathode coupled to ground. The voltage at node 1 relative to ground is termed "VBE1" (voltage between base and emitter). The p-n junction Q2 has an anode coupled to node 2 and a cathode coupled to ground. The voltage at node 2 relative to ground is termed "VBE2." Since the cathodes of both diodes Q1 and Q2 are commoned, the relative voltage between node 1 and node 2, referred to herein as "ΔVBE," is the difference between the two base-emitter voltages. This difference will arise by making sure that the current density in Q2 is lower than that in Q1. A first resistor R1 is coupled between node 2 and node 3. The voltage across R1 is termed "VR1."

In the example of FIG. 1, the p-n junctions Q1 and Q2 may be different sizes and Q2 may be larger than Q1. The junction area of Q2 is an accurately known multiple "α" of the junction area of Q1: Q2=α·Q1. Theoretically, α may or may not be greater than 1, though in practice it is generally chosen in the design to be greater than 1, perhaps between 5 and 40. Further, α may or may not be an integer and quite commonly is not. In one embodiment, the p-n junctions Q1 and Q2 are implemented as an array of well-matched (e.g., virtually identical), co-located elements that are wired together and commonly centroided—that is, the elements of each diode are symmetrically located about a common physical point in the center, or at about the center, of the array. (It is understood that elements may not be perfectly identical due to manufacturing variability and tolerances.) Q1 may consist of K elements and Q2 may consist of αK elements, and as such the ratio α between the junction areas Q2 and Q1 can be accurately determined. In this example, K and αK are integers.

In the example of FIG. 1, current sources I1 and I2 are variable (adjustable) current sources. That is, the amount of current may be adjusted in a linear or analog fashion by a control, such as the signal ICtl. Current source I1 drives a current i1 into the anode of Q1 at node 1, and current source I2 drives a current i2 into R1 and Q2 at node 3. The currents i1 and i2 may be of different magnitudes and i1 may be greater than i2. The current i1 is an accurately known multiple "κ" of the current i2: i1=κ·i2. In one embodiment, this is accomplished using a current mirror scheme. In another embodiment, ICtl may be supplied by a feedback circuit as illustrated in FIG. 2. In this fashion, the current density in Q1 is ακ times that in Q2, with ακ greater than one. In one embodiment, the current sources I1 and I2 are implemented as an array of well-matched (e.g., virtually identical), co-located current-source elements that are wired together and commonly centroided. In one such embodiment, I2 consists of M current-source elements and I1 consists of κM current-source elements, and as such the ratio κ between the currents i1 and i2 can be accurately determined. As will be seen, the current-source elements that comprise I1 and I2 are adjusted in analog fashion in concert, such that the ratio κ between the currents i1 and i2 is maintained.

Current source I3 is also a variable current source which supplies a current i3. In one embodiment, current source I3 includes a number N of well-matched, co-located and centroided current-source elements. These current-source elements may also be virtually identical with those that comprise I1 and I2 and may be commonly centroided in the array with the current-source elements that comprise I1 and I2. As such, the ratio N/M between the currents i3 and i2 can be accurately determined. The current-source elements that comprise I3 are adjusted in analog fashion in concert with the current-source elements that comprise I1 and I2, such that the ratio N/M between the currents i3 and i2 is maintained.

Further, in one embodiment, current source I3 is also a digitally programmable current source that is controlled using a digital signal N. In one such embodiment, the amount of current i3 that is supplied by current source I3 is a function of the number of current-source elements that are turned on (activated) by a digital signal N. In general, current source I3 is a variable current source that supplies an amount of current that is proportional to the value of a digital input signal N.

In one embodiment, the digital input signal N is an eight-bit ($b_7, b_6, \ldots, b_0$) digital signal, with each bit turning on (or off) some number of current-source elements. For example, the most significant bit ($b_7$) can control (turn on or off) 128 ($=2^7$) current-source elements, the second most significant bit ($b_6$) can control 64 ($=2^6$) current-source elements, the third most significant bit ($b_5$) can control 32 ($=2^5$) current-source elements, and so on, with the least significant bit ($b_0$) controlling 1 ($=2^0$) current-source element. In one embodiment, the current-source elements that may be switched on at a particular time are selected in centroidal (or symmetrical) fashion. Under control of an eight-bit signal, current source I3 can provide up to 256 levels of current. At the same time, the current from each of the current-source elements that comprise I3 are adjusted in an analog fashion in concert with those current-source elements that comprise I1 and I2. It is important that the current from each of the current-source elements that comprise I3 is not affected by the number N of elements that are turned on by the digital signal N. It should be understood that, as the value of N is programmed, there will be some number of current-source elements that are turned on to contribute to the current i3 or turned off so that they contribute no current to i3. The number that is turned on by the digital signal N will be equal to N.

It may be desirable to have some number of current-source elements always turned on, in addition to the number N, and always contributing to the current i3. This can be accomplished using, for example, a nine-bit signal, in which one bit (e.g., the most significant bit) is set such that some current-source elements are always turned on, with the remaining eight bits used to control other current-source elements with up to 256 levels of current. The use of nine bits in this manner also increases the possible range of N, from 0-255 to 256-511, for example. Larger values of N reduce the associated quantization error, increasing the accuracy at which the temperature T can be determined. Having a number of current-source elements always on, in addition to the 255 that are controlled by the 8-bit digital signal N, also can shift the operational temperature range of the circuit to a more desirable region of absolute temperature.

Current source I3 drives a current i3 into R2 at node 4. As mentioned above, the current sources I1, I2 and I3 are adjusted in concert in an analog fashion. Further, current source I3 is also separately adjustable; that is, current source I3 can be adjusted independently from current sources I1 and I2. While the current source I3 is adjusted independently of the current sources I1 and I2, the ratio of i3 to i2 (or i3 to i1) can be accurately determined. In one embodiment, the elements of current source I3 and the elements of current sources I1 and I2 are commonly centroided. As such, the ratio of i2/i3 is accurately represented as the ratio M/N.

The voltage across R2 is termed "VR2." The resistors R1 and R2 have different resistances r1 and r2, respectively, and the ratio P between the resistance values of R1 and R2 is accurately known (P=r2/r1). The resistors R1 and R2 can each be realized using an array of virtually identical, co-located resistors that are wired together and commonly centroided, in which case the ratio P between the resistances of R2 and R1 can be accurately determined.

In one embodiment, comparator 112 (e.g., a differential comparator) is connected to the current source I3 and to the first circuitry 102. More specifically, in such an embodiment, one input of comparator 112 is connected to node 4 between the current source I3 and resistor R2, and the other input of comparator 112 is connected to Vout, which is an accurately known voltage, relative to system ground, and which is temperature-independent.

In one embodiment, system 100 also includes a controller 114 that supplies the aforementioned digital input signal N to current source I3 and that is also coupled to the output of comparator 112.

System 100 can be incorporated into an integrated circuit or some other type of semiconductor device in order to determine a temperature T for that circuit/device. More specifically, the temperature is determined at Q1 and Q2, which are co-located. The temperature at Q1 and the temperature at Q2 are considered to be equal and representative of the temperature of the circuit or device incorporating the system 100.

As described above, Q1 and Q2 comprise a pair of p-n junctions that have an accurately known ratio of current density, $\kappa\alpha$, and have substantially the same junction temperature at all times. By design, the current density in Q1 will be higher and equal to $\kappa\alpha$ times the current density in Q2 and as such, the junction voltage of Q1 will be greater than that of Q2. For such a pair of p-n junctions, $\Delta VBE$, the difference between the junction voltages, will obey the following well-known relationship which can be applied to obtain an absolute temperature T:

$$\Delta VBE = n(k/q)(T)\ln(\gamma); \quad (1)$$

where "n" is the ideality factor of a p-n junction, "k" is the Boltzmann constant, "q" is the electron charge, "T" is absolute temperature, and "$\gamma$" is the ratio of the current density in Q1 to the current density in Q2 ($\gamma = \kappa\alpha$). In one embodiment, a value of n=1.008 is used. As stated previously herein, the relative voltage between node 1 and node 2 is equal to $\Delta VBE$.

The temperature T can be determined using relationship (1) and system 100 as follows. The currents i1 and i2 are adjusted in concert in a linear or analog fashion while maintaining the ratio $\kappa$. An analog signal such as ICtl can be used to make this adjustment. Additionally, if desired, a digital signal can be used to turn on some number M (and $\kappa M$) of the current elements that constitute current sources I1 and I2, in a manner similar to that described above for current source I3.

In the example of FIG. 1, at initial power-up and subsequently as temperature changes, the currents i1 and i2 are adjusted in concert (along with the current-source elements in I3) by ICtl in a linear fashion until the voltage relative to ground at node 3 is made equal (or substantially equal) to the voltage relative to ground at node 1 (VBE1). An op-amp can be used to identify when this condition occurs (see FIG. 2, below). When the voltage relative to ground at node 3 is equal to the voltage relative to ground (VBE1) at node 1, the voltage across resistor R1 (VR1) will be equal to $\Delta VBE$, the difference between VBE1 and the voltage relative to ground at node 2 (VBE2). Thus, with this adjustment at any given temperature, the voltage across resistor R1 (VR1) will be proportional to absolute temperature, in accordance with the relation (1) above.

By changing the value of the digital signal N, the current i3 is also adjusted until the voltage across resistor R2 (VR2) is equal (or substantially equal) to Vout. Because VR2=i3*r2 and $\Delta VBE$=VR1=i2*r1, then Vout=i3*r2=i2*(i3/i2)*r1*(r2/r1)=(i3/i2)(r2/r1)*VR1. Thus, $$T = Vout*(i2/i3)(r1/r2)*(q/(nk \cdot \ln(\gamma))). \quad (2)$$

Once values for Vout, R1 and R2 are selected as a matter of design choice, the quantity Vout*(r1/r2)*(q/(nk·ln($\gamma$))) is a known constant "$\beta$." Thus, $$T = \beta(i2/i3). \quad (3)$$

As mentioned above, in one embodiment, i2/i3=M/N. Thus, $$T = \beta'/N, \quad (4)$$

where $\beta' = \beta \cdot M$, and where N is the value of the digital signal when the comparator 112 changes state. Note that, in an ideal sense, i3 is to be restored always to the fixed value Vout/R2. As temperature varies, ICtl will readjust i1 and i2 in concert (along with the current-source elements in I3) to maintain the voltages at nodes 1 and 3 to be equal. Thus i3 departs from the "correct" value of Vout/R2. The controller 114 digitally readjusts i3 to be equal once again to Vout/R2 through the use of N and the comparator 112. The value of N that was used to achieve this is then entered into the relation (4) to find the temperature.

Controller 114 has knowledge of the value of N and can apply relationship (4) to calculate and output a value of the temperature T. In one embodiment, the midpoint of the interval in which the comparator 112 changes state is used in relationship (4). For example, if comparator 112 changes state when N changes from 178 to 179 (actually, the digital signal equivalents of 178 and 179), then a value of N equivalent to 178.5 can be used.

Systems 100 can be referred to as "quasi-static." That is, the temperature of the device is expected to change slowly enough relative to the circuits' response time to be considered constant over the period of time it takes to measure temperature. The first circuitry 102 settles to a value of ICtl such that the voltage at node 3 equals the voltage at node 1, while the temperature is unchanging. Controller 114 can then find a correct value of N, again before the temperature changes significantly.

Therefore, by matching at accurate ratios (but not necessarily equating) I3 and R2 (and i3 and r2) to certain elements and attributes of a bandgap reference circuit (specifically, I2 and R1, and i2 and r1), the operating temperature of a device can be readily and accurately determined, without having to introduce substantial additional circuitry. For example, a separate servo-loop is not needed to control the amount of current supplied by current source I3. Another advantage of system 100 is that the value of N is readily determined and is known to a high degree of granularity (for example, there can be 256 levels of granularity), which means that temperature can also be determined to a high degree of granularity. Furthermore, it is not necessary to measure the currents supplied by current sources I1, I2 and I3, because it is only necessary to know the ratio between i2 and i3.

In the example of FIG. 1, a known reference voltage Vout is supplied by a bandgap reference circuit (first circuitry 102). Certain elements of second circuitry 104 are accurately matched to elements internal to that bandgap reference circuit 102. In general, any voltage that is accurately known, from a "closed" bandgap reference circuit or other accurately known temperature-independent source, can be used as Vout, with the condition that the known reference voltage is relative to the same reference or ground as VR2. In that case, an additional circuitry is needed. Such a system is shown in FIG. 2.

FIG. 2 is a diagram of a system 200 for measuring temperature according to a second embodiment of the present invention. While system 100 of FIG. 1 represents a relatively specific implementation of a device thermometer, system 200 represents a broader, more general implementation.

In the example of FIG. 2, system 200 includes first circuitry 202 and second circuitry 204. In one embodiment, first circuitry 202 includes a variable first current source I1, a variable second current source I2, a first p-n junction Q1, a second p-n junction Q2, a first resistor R1, and an op-amp 216, while second circuitry 204 includes a variable third current source I3 and a second resistor R2. In one embodiment, system 200 also includes a comparator 112 and a controller 114.

System 200 is used to determine a temperature T in a manner similar to that described above. For the current source I2, the number of matched current-source elements may be fixed at M. The number of matched current-source elements for I1 might then be fixed at κM. Accordingly, the currents of I1 and I2 have the ratio κ.

Also, Q1 and Q2 might be made up of κ and αK bipolar elements, respectively, and are centroided, so that the emitter-base junction areas have the ratio α. Thus, the current densities between the emitter-base junctions of Q1 and Q2 have the ratio $_\gamma$, wherein $_\gamma$=κα, and κα must be greater than 1.

When ICtl is adjusted, the voltages at node 1 and at node 3 will cross at some point, which is identified using op-amp 216. At that point, VR1=ΔVBE, which is equal to a known constant (n(k/q)(T)ln($_\gamma$)) times the absolute temperature (see the discussion of relationships (1) and (2) above). As device temperature changes, in the example shown in FIG. 2, the op-amp will adjust (servo) ICtl to keep the voltage at node 1 equal to the voltage at node 3.

Like system 100, system 200 can be referred to as quasi-static. The circuitry performs fast enough and the temperature changes slowly enough so that, effectively, the voltage at node 1 is always equal to the voltage at node 3, and hence VR1 is always proportional to absolute temperature.

The current sources I2 and I3 also match because, for example, I3 also may be comprised of current-source elements with layouts identical to those of I2. Consequently, as controller 114 adjusts N to make VR2 match Vknown, the current ratio i3/i2 will be equal to N/M.

The resistors R1 and R2 are matched and centroided and their respective resistances have the ratio P (P=r2/r1). Accordingly, the voltage across R2 (VR2) is equal to (NP/M) *VR1. The temperature T can be calculated using relationships (2), (3) or (4) above. As described above, it is not necessary to know the values of i1, i2 and i3, nor even the values of r1 and r2 nor the sizes of Q1 and Q2, as long as the ratios α, κ (and hence $_\gamma$) and P are known.

Figure 3:
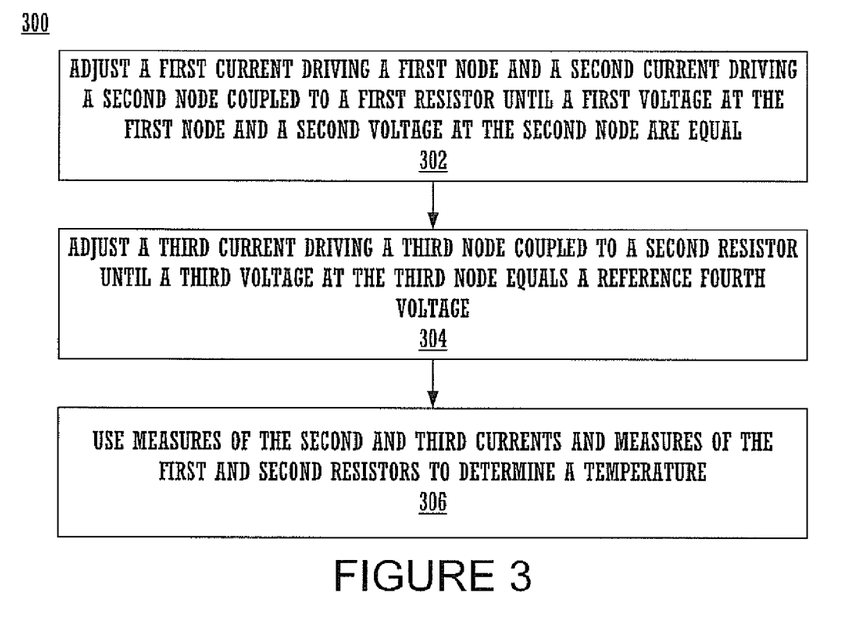
FIG. 3 is a flowchart of a method for measuring temperature in accordance with one embodiment of the present invention.
Figure 4:
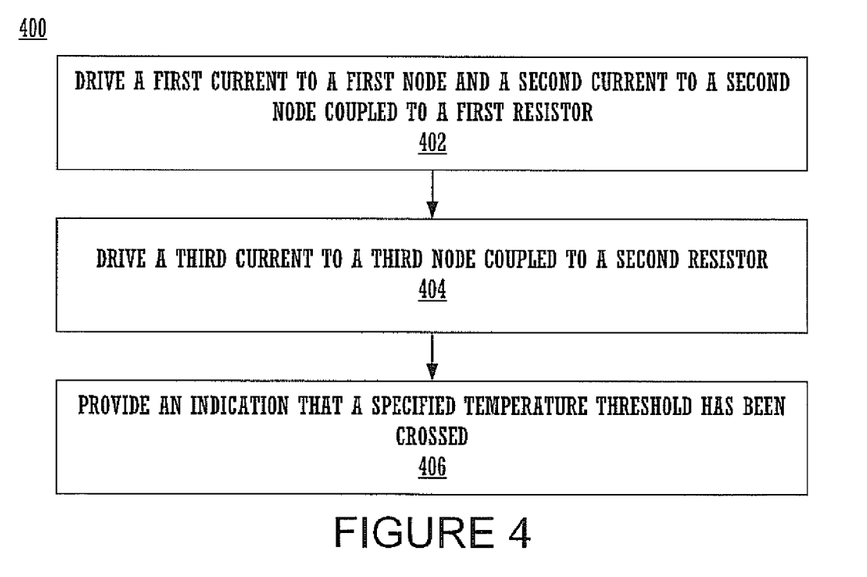
FIG. 4 is a flowchart of a method for monitoring temperature in accordance with one embodiment of the present invention.

FIG. 3 is a flowchart 300 of a method for measuring temperature in accordance with one embodiment of the present invention. FIG. 4 is a flowchart 400 of a method for monitoring temperature in accordance with one embodiment of the present invention. Although specific steps are disclosed in the flowcharts, such steps are exemplary. That is, embodiments of the present invention are well-suited to performing various other steps or variations of the steps recited in the flowcharts. It is appreciated that the steps in the flowcharts may be performed in an order different than presented, and that not all of the steps in the flowcharts may be performed. Some or all of the processes and steps of the flowcharts can be realized, in one embodiment, as a series of instructions that reside in hardware or software and are executed by controller 114 of FIGS. 1 and 2.

In block 302 of FIG. 3, with reference also to FIGS. 1 and 2, a first current (e.g., i1) that is driven to a first node (e.g., node 1) and a second current (e.g., i2) that is driven to a second node (e.g., node 3) are adjusted in concert, until a first voltage (e.g., VBE1) measured at node 1 and a second voltage measured at node 3 are substantially equal.

In block 304, a third current (e.g., i3) that is driven to a third node (e.g., node 4) is adjusted until a third voltage (e.g., VR2) measured at node 4 is substantially equal to a reference fourth voltage (e.g., Vout or Vknown).

In block 306, measures of the second and third currents (specifically, the ratio of i2 to i3) when the third and fourth voltages are substantially equal (specifically, when VR2=Vout or Vknown), and measures of the first and second resistors (specifically, the ratio of r1 to r2), are used to determine a temperature, using relationship (2) for example. In one embodiment, node 1 includes a first p-n junction (e.g., Q1) having a first junction area and node 3 includes a second p-n junction (e.g., Q2) having a second junction area, and the ratio α between the first and second areas, and the ratio κ between i1 and i2, are also used in relationship (2) to determine the temperature ($_\gamma$=κα).

In one embodiment, the second current i2 is produced by using a first number (M) of current-source elements, and the third current i3 is produced using a second number (N) of current-source elements. In such an embodiment, the first and second numbers can be used in relationship (4) to determine the temperature.

Embodiments in accordance with the present invention can also be used to monitor temperature and to provide an indication (e.g., a flag) when a particular temperature is reached or a temperature threshold is crossed. In other words, as can be seen from relationships (2) and (3), the temperature T corresponds to the ratio of the values of i2 and i3. By rearranging relationship (3), the ratio of i2/i3 corresponding to a temperature threshold T-threshold can be defined:

$$i2/i3=(T\text{-threshold})/\beta. \quad (5)$$

In one embodiment, to monitor temperature against a temperature threshold, the digital value of N would be held at a fixed value corresponding to the temperature T-threshold, in accordance with relation N=M(T-threshold)/β. The current source I2 can be controlled in an analog fashion such that the magnitude of the current i2 causes a first voltage (e.g., VBE1) measured at node 1 and a second voltage measured at node 3 to be substantially equal at all temperatures. Concurrently the current source I3 can be controlled such that the magnitude of the current i3 causes a third voltage (e.g., VR2) measured at node 4 and a reference fourth voltage (e.g., Vout or Vknown) to be substantially equal at T-threshold. In other words, ICtl (or M) and N, as well as the other design parameters associated with Q1, Q2, R1 and R2, are set at values that, if utilized in relationships (2), (3) or (4), would cause VR2 to rise to equal a reference fourth voltage (e.g., Vout or Vknown) as the temperature rises to a value of T-threshold.

Thus, for example, the systems 100 and 200 of FIGS. 1 and 2 are in essence operated at a condition meant to detect when the device temperature (measured at Q1 and Q2) reaches T-threshold. As the temperature at Q1 and Q2 increases, the circuit of block 102 of system 100 or the circuit of block 202 of system 200 (FIG. 2) will increase the current i2 to keep the voltages at nodes 1 and 3 equal. In concert, the current i3 (at the fixed value of N) is increased and thus the VR2 will increase. At T-threshold, VR2 will equal Vout or Vknown. When VR2 and Vout or Vknown are equal, comparator 112 will notify controller 114, which in turn can provide an indication that the threshold temperature has been reached. Different values of N can be selected and utilized to identify and implement different temperature thresholds.

FIG. 4 is a flowchart 400 of a method for monitoring temperature in a device in accordance with one embodiment of the present invention. In block 402, with reference also to FIGS. 1 and 2, a first current (e.g., i1) is driven to a first node (e.g., node 1) and a second current (e.g., i2) is driven to a second node (e.g., node 3).

In block 404, a third current (e.g., i3) is driven to a third node (e.g., node 4). The magnitudes of the first, second and third currents are selected such that when the temperature T of the device reaches a specified threshold (e.g., T-threshold), while a first voltage measured at node 1 (e.g., VBE1) and a second voltage measured at node 3 are maintained to be substantially equal, a third voltage measured at node 4 (e.g., VR2) and a reference fourth voltage (e.g., Vout or Vknown) will be substantially equal.

In block 406, if the conditions mentioned in block 404 are satisfied, then an indication that the threshold temperature has been reached can be provided.

In summary, embodiments in accordance with the present invention provide methods and systems for accurately measuring and monitoring temperature in, for example, a device such as an integrated circuit. By matching certain elements and attributes of a first portion (e.g., first circuitry 102 or 202) of a thermometer system with elements and attributes of a second portion (e.g., second circuitry 104 or 204) of the thermometer system, the operating temperature of a device can be readily and accurately determined. Furthermore, it is not necessary to measure the magnitudes of currents, resistances and junction areas in the first and second portions of the system, as long the respective ratios (e.g., κ, α and P) are known.

Embodiments in accordance with the present invention are thus described. While the present invention has been described in particular embodiments, it should be appreciated that the present invention should not be construed as limited by such embodiments, but rather construed according to the below claims.

What is claimed is:

1. A method of measuring temperature, said method comprising:
  adjusting a first current that is driven to a first node and a second current that is driven to a second node until a first voltage measured at said first node and a second voltage measured at said second node are substantially equal, wherein said first node is coupled to ground and wherein said second node and a first resistor are coupled in series to ground and in parallel to said first node, and wherein said second current is driven using a first number of current-source elements;
  adjusting a third current that is driven to a third node until a third voltage measured at said third node is substantially equal to a reference fourth voltage, wherein said third node and a second resistor are coupled in series to ground and in parallel to said first node, and wherein said third current is driven using a second number of current-source elements; and
  using said first number and said second number when said third and fourth voltages are substantially equal and measures of said first and second resistors to determine said temperature.

2. The method of claim 1 further comprising generating said fourth voltage using a bandgap reference circuit.

3. The method of claim 1 wherein said first node comprises a first p-n junction having a first junction area and said second node comprises a second p-n junction having a second junction area that is different from said first junction area, wherein said method further comprises using a ratio between measures of said first and second areas to determine said temperature.

4. The method of claim 1 further comprising:
  adjusting said first current and said second current in concert such that a ratio of measures of said first and second currents remains substantially constant as said first and second currents are changed; and
  using said ratio to determine said temperature.

5. A method of monitoring temperature in a semiconductor device, said method comprising:
  driving a first current to a first node and a second current to a second node, wherein said first node is coupled to ground and wherein said second node and a first resistor are coupled in series to ground and in parallel to said first node, wherein said second current is driven using a first number of a first plurality of current-source elements;
  driving a third current to a third node, wherein said third current is driven using a second number of a second plurality of current-source elements and wherein said third node and a second resistor are coupled in series to ground and in parallel to said first node, and wherein further said first, second, and third currents are selected such that when a temperature of said device reaches a specified threshold, a first voltage measured at said first node and a second voltage measured at said second node will be substantially equal and a third voltage measured at said third node and a reference fourth voltage will be substantially equal; and
  using said first and second numbers to determine said temperature.

6. The method of claim 5 further comprising generating said fourth voltage using a bandgap reference circuit.

7. The method of claim 5 wherein said first node comprises a first p-n junction having a first junction area and said second node comprises a second p-n junction having a second junction area that is different from said first junction area, wherein said method further comprises using a ratio between measures of said first and second areas to determine said temperature.

8. The method of claim 5 further comprising:
  adjusting said first current and said second current in concert such that a ratio of measures of said first and second currents remains substantially constant as said first and second currents are changed; and
  using said ratio to determine said temperature.

9. The method of claim 5 further comprising providing an indication that said temperature has reached said threshold.

10. A method of monitoring temperature in a semiconductor device, said method comprising:
  selecting a first current that is driven to a first node, wherein said first node is coupled to ground;
  selecting a second current that is driven to a second node, wherein said second node and a first resistor are coupled in series to ground and in parallel to said first node, wherein said first current and said second current are selected such that a first voltage measured at said first node and a second voltage measured at said second node are substantially equal and said first current is larger than said second current, and wherein said second current is driven using a first number of a first plurality of current-source elements;
  selecting a third current driven to a third node, wherein said third node is coupled to said first and second nodes and wherein said third node and a second resistor are coupled in series to ground, wherein said third current is selected such that a third voltage measured at said third node is substantially equal to a reference fourth voltage, and wherein said third current is driven using a second number of a second plurality of current-source elements; and
  determining a temperature value using a value of said first number, a value of said second number, and measures of said first and second resistors.

11. The method of claim 10 further comprising outputting said fourth voltage from a bandgap reference circuit.

12. The method of claim 10 further comprising determining said temperature value also using a ratio between measures of a first junction area of a first p-n junction of said first node and a second junction area of a second p-n junction of said second node, wherein said second junction area is different from said first junction area.

13. The method of claim 10 further comprising driving said first current using a first variable current source.

14. The method of claim 13 further comprising:
adjusting said first current and said second current in concert such that a ratio of measures of said first and second currents remains substantially constant if said first and second currents are changed; and
determining said temperature value also using said ratio.

15. The method of claim 10 further comprising:
changing said value of said second number of current-source elements to change said third voltage;
inputting said third voltage and said fourth voltage to a comparator, wherein an output of said comparator changes state if a measure of said third voltage crosses a threshold established by a measure of said fourth voltage; and
recording said value of said second number in response to said comparator changing state.

* * * * *

UNITED STATES PATENT AND TRADEMARK OFFICE
CERTIFICATE OF CORRECTION

PATENT NO.       : 8,496,379 B2
APPLICATION NO.  : 12/868548
DATED            : July 30, 2013
INVENTOR(S)      : Schnaitter It is certified that error appears in the above-identified patent and that said Letters Patent is hereby corrected as shown below:

In the Specification

In Column 7, Line 23, in Equation (1), delete "$\Delta VBE = n(k/q)(T)\ln(\gamma);$" and insert -- $\Delta VBE = n(k/q)(T)\ln(\gamma);$ --, therefor.

In Column 7, Line 26, delete ""$\gamma$"" and insert -- "$\gamma$" --, therefor.

In Column 7, Line 27, delete "($\gamma = \kappa\alpha$)." and insert -- ($\gamma = \kappa\alpha$). --, therefor.

In Column 7, Line 59, in Equation (2), delete "$T = Vout*(i2/i3)(r1/r2)*(q/(nk\cdot\ln(\gamma)),$" and insert -- $T = Vout*(i2/i3)(r1/r2)*(q/(nk\cdot\ln(\gamma)).$ --, therefor.

In Column 9, Line 11, delete "$\gamma$, wherein $\gamma$" and insert -- $\gamma$, wherein $\gamma$ --, therefor.

In Column 9, Line 15, delete "$(n(k/q)(T)\ln(\gamma))$," and insert -- $(n(k/q)(T)\ln(\gamma))$ --, therefor.

In Column 9, Line 37, delete "$\gamma$)" and insert -- $\gamma$) --, therefor.

In Column 10, Line 7, delete "($\gamma$" and insert -- ($\gamma$ --, therefor.

Signed and Sealed this
Twenty-ninth Day of April, 2014

Michelle K. Lee
*Deputy Director of the United States Patent and Trademark Office*